March 17, 1964

G. E. BORGARD 3,125,117

CHECK VALVE ASSEMBLY

Filed Aug. 8, 1961

INVENTOR
GLENN E. BORGARD
BY
ATTORNEYS

United States Patent Office 3,125,117
Patented Mar. 17, 1964

3,125,117
CHECK VALVE ASSEMBLY
Glenn E. Borgard, Overland, Mo., assignor to Wagner Electric Corporation, St. Louis, Mo., a corporation of Delaware
Filed Aug. 8, 1961, Ser. No. 130,155
4 Claims. (Cl. 137—493.4)

The invention relates generally to fluid control devices for braking systems, and more particularly to a novel check valve assembly for a master cylinder.

Due to the requirements of master cylinders for moving relatively large volumes of fluid substantially instantaneously from the cylinder bore through a brake system and at relatively high pressures, prior art check valves have had many objectionable features including restricting free fluid passage, interference with piston return springs and other parts, and have been subject to destruction or inoperativeness.

The principal object of the present invention is to provide a check valve assembly for controlling a master cylinder outlet in a positive, efficient manner without being subject to the objectionable features of the prior art devices.

Another object is to provide a check valve having positive control means assuring substantially unrestricted fluid flow therethrough.

Another feature is to provide a check valve having self-aligning parts wherein relative axial and radial movement provide positive sealing without fouling due to foreign matter or the like.

Still another object is to provide a check valve for controlling and maintaining a predetermined residual fluid pressure to maintain sealing cups and like parts of a hydraulic brake system in seated condition to minimize fluid leakage and assure positive compensation of fluid in the system, the solid column of fluid in the lines also facilitating instantaneous response to braking actuation.

A further object is to provide a check valve for isolating the master cylinder from the remainder of a braking system to prevent fluid drainage during repair of wheel cylinders or like parts of the system.

These and still other features and advantages will become more apparent hereinafter.

The invention is embodied in a check valve assembly comprising first and second reversely-acting, spring-loaded sealing units controlling fluid displacement from and return to a master cylinder, one of the units being carried on the other unit for relative floating movement, and the one unit including means for maintaining fluid passage through the spring of the one unit during fluid displacement. The invention also consists in the parts and in the arrangement and combination of parts hereinafter described and claimed.

Figure 1:
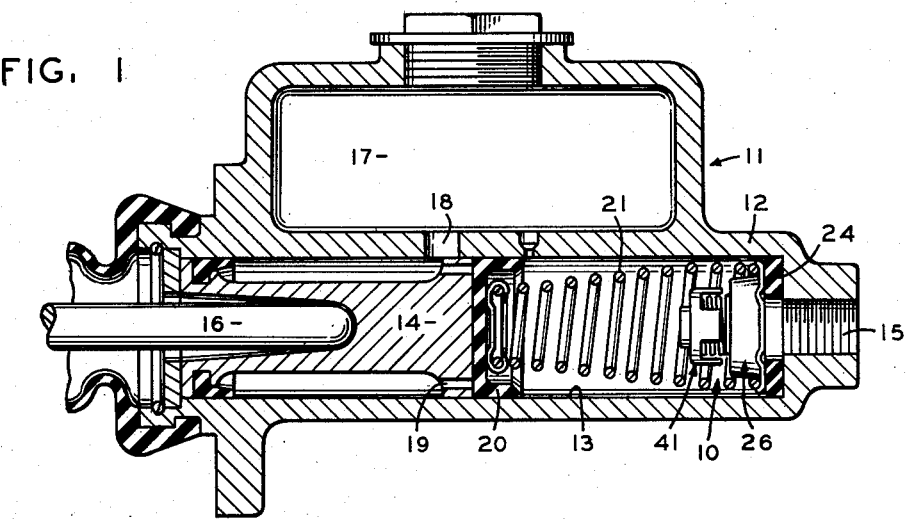
Figure 2:
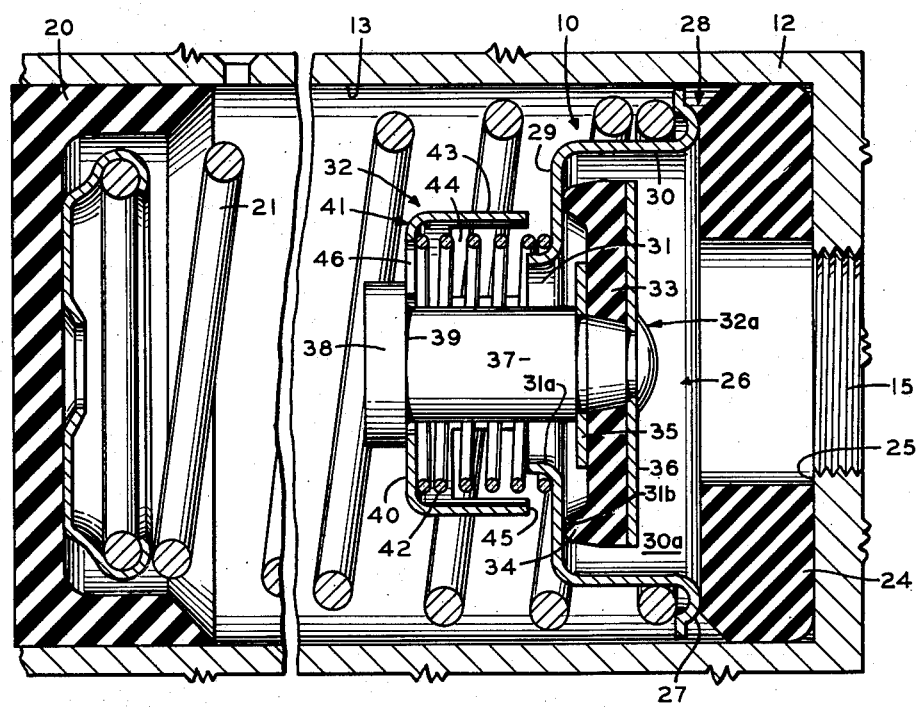

In the accompanying drawing which forms a part of this specification and wherein like numbers refer to like parts wherever they occur:

FIG. 1 is a vertical sectional view of a typical master cylinder construction having a check valve control embodying the present invention, and FIG. 2 is a greatly enlarged fragmentary sectional view showing the details of the check valve assembly.

Referring now to the drawings, it will be seen that a check valve assembly 10 embodying the present invention is utilized in a typical master cylinder 11. The master cylinder includes a housing 12 having a bore 13 in which a master cylinder piston 14 is movable toward an outlet 15 by actuation of push rod 16 due to suitable operator controls therefor (not shown). The outlet 15 is connected to a typical hydraulic braking system for fluid pressure actuation of slave fluid motors to produce a braking effort of a vehicle or the like, and the hydraulic brake system forms no part of the present invention and disclosure thereof is not believed necessary to a complete understanding of the invention. The master cylinder also includes a reservoir 17 adapted to maintain a full column of fluid in the master cylinder bore 13 and the brake system through compensation port 18 and passages 19 or the like. The master cylinder piston 14 also includes the usual sealing cup 20, and the piston 14 is normally maintained in a retracted position, as shown in FIG. 1, by the return spring 21 having one end seated against the sealing cup 20.

Referring now to FIG. 2, the check valve assembly 10 includes a resilient O-ring 24 positioned against shoulder 25 at the end of the master cylinder bore 13 in which outlet 15 is formed. A cup-shaped housing 26 includes an annular rib or sealing lip 27 normally maintained in sealing contact with the O-ring 24 by the action of the other end of the return spring 21 biasing the cup-shaped housing in a direction toward the outlet 15. The housing 26 and O-ring 24, together with the spring force of the return spring 21, may be referred to as a primary or first sealing unit 28 of the check valve assembly 10. It will be noted that the cup-shaped housing 26 is an integral member which also includes a radial portion or end wall 29 connected by a cylindrical or annular side wall 30 to the rib 27, and an open ended chamber 30a is provided within the side wall 30 between the end wall 29 and the rib 27 in pressure fluid communication with the master cylinder outlet 15. The end wall 29 is provided with a large central opening or port 31 defined by an annular side wall or flange 31a extending axially away from the outlet 15. A valve seat 31b is also provided on the end wall 29 between the side walls 30 and 31a in circumscribing relation with the port 31.

The check valve assembly 10 is also provided with a secondary sealing unit 32 which includes a self-aligning valve element 32a having resilient housing seal 33 positioned within the chamber 30a defined by the cup-shaped member 26, the seal 33 having an annular lip 34 adapted for sealing engagement with the valve seat 31b on the end wall 29 of the housing 26 and the seal having a radial clearance with the housing side wall 30 to accommodate relative radial and axial movement between said seal and the valve seat 31b. The housing seal 33 is mounted between flanges 35 and 36 secured on a valve stem 37 which extends through the opening 31 of the housing 26 in a direction away from the outlet 15. It will be noted that the valve stem 37 is spaced away from the wall of the opening 31 to accommodate free flow of pressure fluid therepast and permit radial and axial movement of the stem and seal in the opening 31 and chamber 30a of the housing 26. The valve stem 37 has an enlarged head portion or abutment member 38 providing a stop shoulder 39 for abutment with the base wall 40 of a cup-shaped retainer or housing 41. A spring 42 has one end seated against the end wall 29 of the cup-shaped housing 26 in circumscribing relationship with the side wall 31a to substantially prevent shifting or displacement of said spring, and the other end of the spring 42 is seated against the base wall 40 of the retainer 41 for biasing the retainer against the stop 39 to move the stem 37 and seal 33 in a direction away from the outlet 15 thereby seating the seal lip 34 on the end wall valve seat 31b of the housing 26. The retainer 41 has a mutilated side wall or sleeve 43 of crenelated configuration forming relatively large openings 44 therein, and the ends 45 of the side wall portions are spaced a predetermined distance away from the end wall 29 of the housing 26 in order to prevent full compression of spring 42 during pressure fluid displacement from the master cylinder 11. The base wall 40 of the retainer 41 is also provided with an aperture defined by a plurality of radial slots 46 to further facilitate the free passage of pressure fluid past the retainer and spring during actuation of the master cylinder piston 14. It will be noted that the valve stem 37 is spaced away from the aperture 46 to permit radial and axial movement of said stem in said aperture.

In operation, the compressive force of the master cylinder spring 21 normally maintains the housing seat or rib 27 in sealed engagement with the O-ring 24, and the valve element 32a is normally rigidly interconnected between the housing 26 and the retainer 32 in response to the compressive force of the spring 42 which normally maintains the valve seat 31b engaged with the sealing member 33 and the retainer base wall 40 engaged with abutment member 38. The force of the return spring 21 acting on the housing 26 is predetermined in order to maintain a relatively low residual fluid pressure in the braking system on the outlet side 15 of the check valve assembly 10. This residual fluid pressure acts on the other sealing parts of the brake system, such as the wheel cylinder cup (not shown), to maintain these parts in sealing relationship with their cooperating sealing seats, such as the wheel cylinder bores. The force of the valve spring 42 normally maintains the housing 26, retainer 32 and valve element 32a substantially in axial alignment; however, due to the floating or self-aligning relation between these component parts, it is apparent that relative radial and axial displacement, i.e., cocking, will occur, as discussed hereinafter.

When the master cylinder piston 14 is energized in a pressure developing direction toward the outlet 15, pressure fluid is displaced from the master cylinder bore 13 through the retainer slots 46 and openings 44, between the coils of the spring 42 and through the housing opening 31. When the fluid pressure acting on the effective area of the sealing member 33 creates a force great enough to overcome the compressive force of the spring 42 and the residual fluid pressure on the outlet side of the seal 33, the sealing member 33 is moved to the right in FIG. 2 and disengages the valve seat 31b so that the pressure fluid flows through the housing chamber 30a and the outlet 15 to create a fluid pressure effective to actuate the components of the braking system. The rightward movement of the sealing member 33 carries the valve stem 37 and the retainer 41, but movement is limited by abutment of the ends 45 of the retainer side wall portions 43 with the housing end wall 29. This lost motion connection prevents a solid height pile-up of the coils of the spring 42 or, in other words, maintains the coils in spaced relation to provide for the free flow of pressure fluid through the check valve assembly 10, particularly under super-charging conditions in which high fluid pressures are generated almost instantaneously in the bore 13. The abutment of the retainer side wall ends 45 with the housing end wall 29 frequently damages or distorts the retainer base wall 40 and sidewalls 43 particularly when the check valve assembly 10 is subjected to relatively high operating fluid pressures. When such damage is sustained by the retainer 41, the abutting engagement between the valve element abutment member 38 and the retainer base wall 40 is naturally affected wherein said retainer is axially and radially displaced, i.e. cocked, relative to the valve element 32a and housing 26. The force of the spring 42 is transmitted through the cocked or mis-aligned retainer 41 to effect relative self-aligning movement of the valve element 32a which compensates for the mis-alignment or cocked position of the retainer 41 by repositioning the sealing member 33 on the valve seat 31b while substantially maintaining the sealing engagement therebetween. In other words, the floating or self-aligning relation of the valve element 32a with the housing 26 and retainer 40 serves to maintain the sealing member 33 in a plane substantially parallel with that of the valve seat 31b regardless of the relative displacement or cocking of said retainer and housing.

It is apparent that braking applications will frequently produce static pressure conditions in which the fluid pressures on both sides of the seal 33 are equal, and under such conditions the spring 42 will seat the seal 33 on the base wall 29 of the housing 26.

When the master cylinder piston 14 is de-energized and returned by the spring 21 in a direction opposite to the pressure developing actuation thereof, a partial vacuum is created in the master cylinder bore 13. The pressure differential thus created between the displaced fluid pressure in the brake system and the partial vacuum in the master cylinder bore 13 plus the compressive force of the valve spring 42 seats the sealing member 33 against the valve seat 31b, and the pressure differential also acts upon the effective area of the seated sealing member 33 and the housing 26 to move the entire check valve assembly 10 to the left in FIG. 2 against the compressive force of the master cylinder spring 21 thereby unseating the rib 27 from the O-ring 24. Accordingly, reverse or return flow of displaced pressure fluid is effected from the brake system through the outlet 15 and past the check valve assembly 10, and upon the destruction of the partial vacuum in the master cylinder bore 13, the compressive force of the master cylinder spring 21 serves to re-engage the check valve assembly 10 with the O-ring 24 trapping a residual fluid pressure in the brake system. It is apparent that the force of the trapped fluid pressure acting against the effective area of the housing 26 within the rib seal 27 will be equalized by the force of the return spring 21, whereby the return spring determines the magnitude of the trapped fluid pressure.

It will now be apparent that the present check valve assembly 10 permits relatively large volumes of fluid to be moved substantially instantaneously therethrough inasmuch as the abutment between the retainer ends 45 and the housing base portion 29 limits the spring compression to prevent the piling-up of the coils to a solid column. Obviously, without this abutment pressure fluid flow through the check valve assembly 10 would be restricted and a back pressure or pressure drop across the check valve assembly would tend to bend the spring 42 or retainer 41, or drive the valve stem 37 entirely through the retainer 41 and destroy the effectiveness of the check valve.

The valve element 32a of the secondary sealing unit 32 is movable in an axial and radial direction for self-aligning purposes relative to the retainer 40 and the cup-shaped housing 26 of the primary sealing unit 28. This relative movement provides a floating or self-aligning feature permitting the parts to properly seal, and dirt or other foreign matter deposited on the surfaces will not cause fouling of the valve. It is also clear that the sealing member 33 cannot be incorrectly seated in a "cocked" position relative to the valve seat 31b on the housing 26.

This invention is intended to cover all changes and modifications of the example herein disclosed which will be readily apparent to all skilled in the art, and the invention is intended to be limited only by the claims which follow.

What I claim is:

1. A self-aligning check valve for a master cylinder comprising a pair of housings movable radially and axially with respect to each other and displaceable into a cocked position, a port in one of said housings, a valve seat circumscribing said port, the other of said housings having a substantially planar end portion, aperture means in the end portion of said other housing, a valve element extending through said port and aperture means including an abutment member on one end thereof extending axially beyond the end portion of said other housing to obviate interference therebetween when said one housing is displaced to the cocked position, a radially extending shoulder on said abutment member for engagement with the end portion of said other housing, and a sealing member on the other end thereof for engagement with said valve seat, spring means urging said housings apart to normally abut the end portion of said other housing with said shoulder on said abutment member and sealably engage said valve seat with said sealing member to close said port, and a predetermined clearance between said valve element and aperture means to obviate interference therebetween when said one housing is displaced to the cocked position, said valve element being radially and axially movable relative to said housings in response to the spring force acting on said housings upon movement of said housings into the cocked position to normally position said sealing member in a plane substantially parallel with that of said valve seat.

2. A check valve comprising a pair of relatively movable housings normally in axial alignment, said housings being radially and axially movable with respect to each other and displaceable into cocked positions with respect to each other, a substantially planar radially extending end portion on one of said housings, aperture means extending axially through the end portion of said one housing and a port in the other of said housings, a self-aligning valve element normally interconnecting said housings and movable radially and axially relative to said housings including a valve stem extending through said aperture means and port, and abutment member on one end of said valve stem and extending axially beyond said planar end portion of said one housing to obviate interference therebetween when said one housing is displaced to the cocked position, a shoulder on said abutment member extending radially from said valve stem, a radially extending sealing member on the other end of said valve stem, spring means normally urging the planar end portion of said one housing into abutment with said shoulder on said abutment member and said other housing into sealable engagement with said sealing member to close said port, and a predetermined clearance between said valve stem and said aperture means and port to permit self-aligning movement of said valve element in both radial and axial directions relative to said housings in response to the spring force acting thereon when said housings are displaced into the cocked position in order to effect co-planar sealing engagement between said sealing member and said other housing.

3. A self-aligning check valve for controlling pressure fluid flow through a master cylinder outlet having a seal disposed in circumscribing relation therewith comprising a valve housing and retainer normally in axial alignment, said valve housing and retainer being radially and axially movable and displaceable into a cocked position with respect to each other, said valve housing including an annular sidewall connected with a radially extending end wall, a free end on said side wall forming an annular lip for sealing engagement with the master cylinder outlet seal, a centrally located port in said end wall for fluid pressure communication with said master cylinder outlet, said valve retainer having a radially extending and substantially planar base wall, centrally located aperture means extending through said base wall, a self-aligning valve element extending through said port and aperture means and having a spaced abutment thereon, said abutment member extending axially beyond said base wall to obviate interference therebetween when said valve retainer is displaced to the cocked position, a radial shoulder on said abutment member for coplanar engagement with said base wall, a radially extending sealing member on said valve element for coplanar engagement with the end wall on said valve housing about said port, spring means interposed between said valve housing and retainer base wall normally urging said retainer into coplanar engagement with said abutment member and said end wall of said valve housing into coplanar engagement with said sealing member to close said port, and a predetermined radial clearance between said valve element and said aperture means and port and between said sealing member and said annular side wall of said housing to permit self-aligning movement of said valve element in both radial and axial directions relative to said valve housing and retainer in response to the spring force acting thereon upon relative displacement of said valve housing and retainer into the cocked position in order to predetermine the sealing position of said sealing member in substantially co-planar relation with said end wall.

4. A self-aligning check valve for controlling a master cylinder outlet having a seal disposed in circumscribing relation therewith comprising relatively movable first and second housings normally positioned in axial alignment and relatively displaceable into a cocked position, said first housing including an annular sidewall and a radially extending end wall, a free end on said sidewall for sealing engagement with said master cylinder outlet seal, a chamber within said side wall between said end wall and free end and in open pressure fluid communication with said master cylinder outlet, a centrally located port in said end wall connecting with said chamber, a valve seat on said end wall in circumscribing relation with said port, said second housing including a radially extending substantially planar base wall, peripheral flange means extending axially from said base wall and having a free end normally in juxtaposition with the end wall of said first housing to limit the axial movement of said second housing, centrally located aperture means in said base wall, and a self-aligning valve element normally interconnecting said housings and movable radially and axially relative to said housings including a valve stem extending through said aperture means and port, an abutment member on one end of said valve stem and extending axially beyond said base wall to obviate interference therebetween upon displacement of said second housing to the cocked position, a substantially planar shoulder on said abutment member and extending radially from said valve stem for abutting engagement with said base wall, a sealing member on the other end of said valve stem and positioned in said chamber for sealing engagement with said valve seat, spring means interposed between said first and second housings, the compressive force of said spring means normally urging said base wall into abutting engagement with said abutment member and said sealing member into sealing engagement with said valve seat to interrupt pressure fluid communication between said port and chamber, and a predetermined radial clearance between said valve stem and said aperture means and port and between said side wall and said sealing member to permit self-aligning movement of said valve element in both radial and axial directions relative to said housings in response to the spring force acting thereon when said housings are relatively displaced into the cocked position in order to predeterminately position said sealing member in substantially co-planar relation with said valve seat.

References Cited in the file of this patent

UNITED STATES PATENTS

| 1,960,709 | Olenick | May 29, 1934 |
| 2,191,636 | Walker | Feb. 27, 1940 |
| 2,628,810 | Moore | Feb. 17, 1953 |

FOREIGN PATENTS

| 1,035,787 | France | Apr. 22, 1953 |